United States Patent
Chen et al.

(10) Patent No.: US 10,133,887 B1
(45) Date of Patent: Nov. 20, 2018

(54) CARD READER AND ELECTRONIC PROTECTION MODULE THEREOF

(71) Applicant: UNIFORM INDUSTRIAL CORP., New Taipei (TW)

(72) Inventors: Yu-Tsung Chen, New Taipei (TW); Ta-Wei Chou, New Taipei (TW)

(73) Assignee: Uniform Industrial Corp., New Taipei (TW)

( * ) Notice: Subject to any disclaimer, the term of this patent is extended or adjusted under 35 U.S.C. 154(b) by 0 days.

(21) Appl. No.: 15/864,241

(22) Filed: Jan. 8, 2018

(30) Foreign Application Priority Data

Jul. 25, 2017 (TW) .............................. 106210950 U

(51) Int. Cl.
*G06K 7/08* (2006.01)
*G07F 19/00* (2006.01)

(52) U.S. Cl.
CPC ............ *G06K 7/087* (2013.01); *G07F 19/205* (2013.01)

(58) Field of Classification Search
CPC ........ G06K 7/0004; G06K 7/08; G06K 7/082; G06K 7/087; G06K 7/0021; G07F 19/205
See application file for complete search history.

(56) References Cited

U.S. PATENT DOCUMENTS

| | | | |
|---|---|---|---|
| 2005/0023348 A1* | 2/2005 | Lucas | G06K 7/0004 235/440 |
| 2009/0302109 A1* | 12/2009 | Kerner | G06K 7/0013 235/439 |
| 2016/0267299 A1* | 9/2016 | Yanko | G06K 7/0013 |
| 2018/0150656 A1* | 5/2018 | Kuwaki | G06K 7/00 |

* cited by examiner

*Primary Examiner* — Laura Gudorf
(74) *Attorney, Agent, or Firm* — Muncy, Geissler, Olds & Lowe, P.C.

(57) ABSTRACT

A card reader and an electronic protection module thereof are provided. The electronic protection module includes a circuit substrate, a first outer cover, a second outer cover, first communicated pieces, second communicated pieces, a first soft circuit board, and a second soft circuit board. The first soft circuit board covers a magnetic-card signal reading element located on a surface of the circuit substrate, the second soft circuit board covers a chip-card signal reading element located on the other surface of the circuit substrate, and the first outer cover and the second outer cover respectively cover the outside of the first soft circuit board and the outside of the second soft circuit board, to achieve a coating function of a stereoscopic box shape. Two sides of the circuit substrate are covered for protection, so that the card reader having card swiping and card inserting functions is provided with a protection mechanism.

9 Claims, 13 Drawing Sheets

CARD READER AND ELECTRONIC PROTECTION MODULE THEREOF

CROSS-REFERENCE TO RELATED APPLICATION

This non-provisional application claims priority under 35 U.S.C. § 119(a) to Patent Application No. 106210950 filed in Taiwan, R.O.C. on Jul. 25, 2017, the entire contents of which are hereby incorporated by reference.

BACKGROUND

Technical Field

The present invention relates to a protection module, and in particular, to a card reader and an electronic protection module thereof.

Related Art

Currently, payment methods after consumption become more convenient. Usually, cards are used as a payment method, so that cash does not need to be carried with. In addition, a card may be used as an access control card. Info'Illation of the card is received by using a card swiping machine or a card inserting machine. This is quite convenient in use.

Currently, various card readers need to be designed with a protection mechanism in structure, to prevent stealing of credit card information by gangsters and the like by means of invasion or bootlegging, thereby avoiding the occurrence of financial losses and financial disorder.

Usually, a card reader having dual functions of card swiping and card inserting is not designed with a perfect protection mechanism, a reading element related to card swiping and a reading element related to card inserting have not been cooperated with a circuit board in disposition, and there is no wire mesh protection outside the reading elements. Consequently, an application range of the card reader is reduced, and the possibility of invasion and information steeling increases.

SUMMARY

In view of the foregoing problems, the present invention provides a card reader and an electronic protection module thereof, to resolve the foregoing problems.

An embodiment of the present invention provides an electronic protection module, including a circuit substrate, a first outer cover, a second outer cover, a plurality of first communicated pieces, a plurality of second communicated pieces, a first soft circuit board, a second soft circuit board, and a baffle. The circuit substrate includes a first surface, a second surface, and a groove. The first surface includes a plurality of first connection points, and the first surface is electrically connected to a magnetic-card signal reading element. The second surface includes a plurality of second connection points, and the second surface is electrically connected to a chip-card signal reading element. The groove passes through from the first surface to the second surface. The first outer cover is disposed on the first surface, and the first outer cover includes a first through hole. The magnetic-card signal reading element is located in the first through hole. The second outer cover is disposed on the second surface, the chip-card signal reading element is disposed in the second outer cover, and the second outer cover includes a second through hole and a plurality of columns. The second through hole corresponds to a slot of the chip-card signal reading element. The plurality of first communicated pieces is respectively in contact with the first connection points. One end of each of the plurality of second communicated pieces is positioned on one of the columns and the other end of the second communicated piece is in contact with one of the second connection points. The first soft circuit board is adhered to an inner surface of the first outer cover, and the first soft circuit board includes a first opening, a plurality of first holes, and a first terminal. The first opening corresponds to the first through hole of the first outer cover, the plurality of first holes is respectively disposed corresponding to locations of the first communicated pieces, and the first terminal is electrically connected to the circuit substrate. The second soft circuit board is adhered to an inner surface of the second outer cover, and the second soft circuit board includes a second opening, a plurality of second holes, a second terminal, and a plurality of welded pads. The second opening corresponds to the second through hole of the second outer cover, and the plurality of second holes is respectively disposed corresponding to locations of the second communicated pieces. The columns respectively pass through the second holes, the second terminal is electrically connected to the first surface of the circuit substrate through the groove from the second surface to the first surface, and the welded pads are located on two sides of the second terminal. The baffle is fastened in the groove, one end of the baffle extends to a rear side of the chip-card signal reading element, and the welded pads cover an outer side of the other end of the baffle and are electrically connected to an inner side of the baffle.

In some embodiments, two ends of the baffle include a narrow board and a wide board, the narrow board passes through the groove to the rear side of the chip-card signal reading element, and the width of the wide board is greater than the width of the groove, so that the wide board is welded on the first surface.

In some embodiments, the second terminal and the welded pads extend from an outer side surface of the wide board to an inner side surface of the wide board, and the welded pads are welded on the inner side surface of the wide board.

In some embodiments, the baffle includes a plurality of pins extending outwards from two side ends of the wide board, and the circuit substrate includes a plurality of buckle holes inserted by the pins.

In some embodiments, the electronic protection module further includes a lock column disposed on the circuit substrate, where the lock column passes through a limiting hole of the second terminal to fasten the second terminal.

In some embodiments, the electronic protection module further includes a conversion board, where one end of the conversion board is electrically connected to the first surface of the circuit substrate, the other end of the conversion board is connected to the magnetic-card signal reading element, and the first terminal is connected to a connection port of the conversion board.

In some embodiments, the first soft circuit board includes a plurality of first overlapped areas, the first soft circuit board is bent to a box shape, and the first overlapped areas are respectively located at four corners of the first soft circuit board.

In some embodiments, the second soft circuit board includes a plurality of second overlapped areas, the second soft circuit board is bent to a box shape, and the second overlapped areas are respectively located at four corners of the second soft circuit board.

The present invention further provides a card reader in an embodiment. The card reader includes a housing and the foregoing electronic protection module. The housing includes an accommodation area in which the electronic protection module is disposed, a card swiping slot corresponding to the magnetic-card signal reading element, and a card inserting slot corresponding to the chip-card signal reading element, where the housing further includes a plurality of fixed columns located inside the accommodation area, the fixed columns respectively pass through the first holes, and one end of each of the first communicated pieces is positioned on one of the fixed columns.

In some embodiments, the first communicated pieces and the second communicated pieces each include a body and a conductive end, each of the fixed columns of the housing abuts against an inner side surface of a groove of the body of the first communicated piece, and each of the columns of the second outer cover abuts against an inner side surface of a groove of the body of the second communicated piece.

The baffle extends to the rear side of the chip-card signal reading element, to cover the rear side of the chip-card signal reading element and avoid the possibility that the rear side of the chip-card signal reading element is invaded, thereby improving a protection function on the rear side of the chip-card signal reading element. In this case, the chip-card signal reading element forms an electrical receptacle connector and has a plurality of terminals for transmitting signals. Exposed welded pins of the terminals are located in the location in which the circuit board is welded at the rear of the electrical receptacle connector. If not covered by the baffle, the rear side of the chip-card signal reading element is easy to be invaded, and the welded pins of the terminals are easy to be connected, resulting in information stealing.

In addition, by using the first soft circuit board and the second soft circuit board that are disposed on two opposite surfaces of the circuit substrate and that have a protection function, the first soft circuit board is covered by the first outer cover, and the second soft circuit board is covered by the second outer cover, to achieve a coating function of a stereoscopic box shape. That is, two sides of the circuit substrate are covered for protection, and the magnetic-card signal reading element and the chip-card signal reading element on the two sides of the circuit substrate are covered and protected. When the first soft circuit board or the second soft circuit board is invaded, a loop protection program is started, so that the card reader having card swiping and card inserting functions is provided with a perfect protection mechanism.

DETAILED DESCRIPTION

Figure 1:
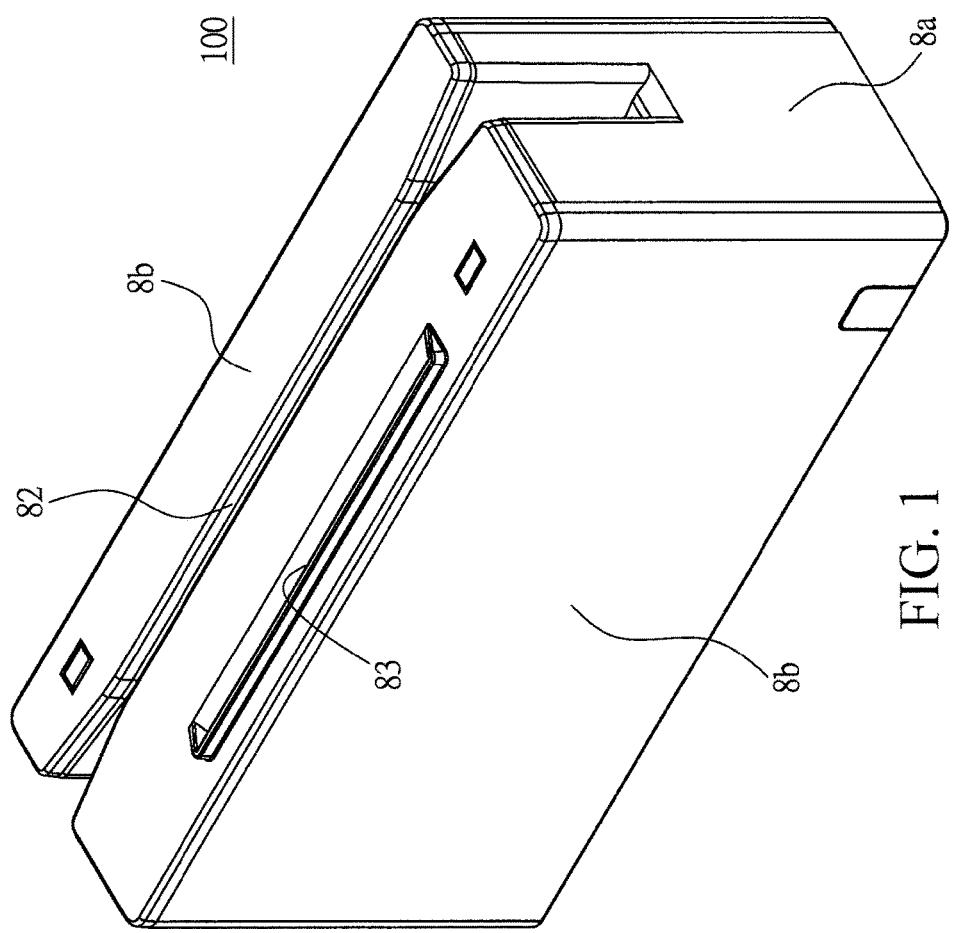
FIG. 1 is a schematic outside view of a card reader according to an embodiment of the present invention.
Figure 4:
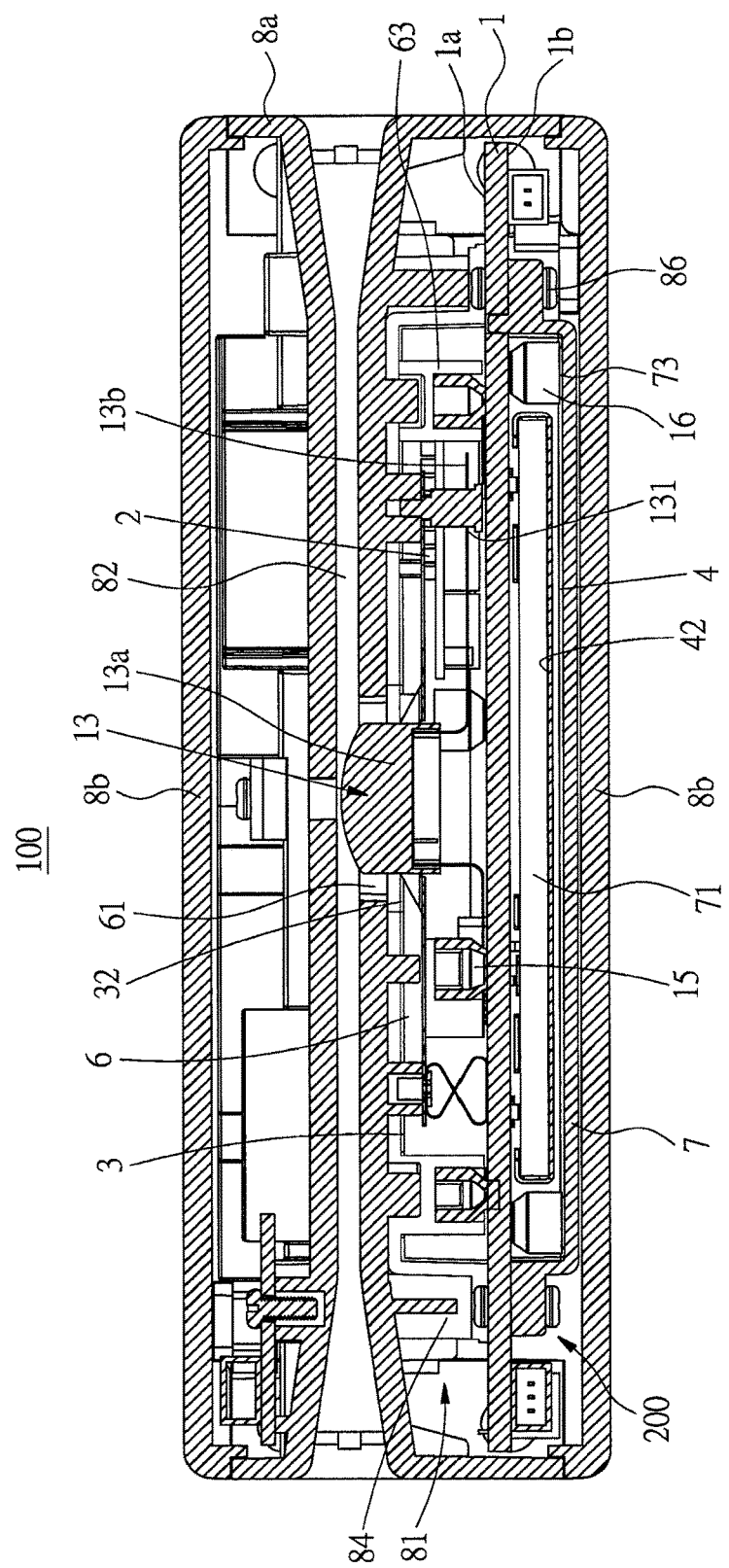
FIG. 4 is a schematic sectional side view of a card reader according to an embodiment of the present invention.

Referring to FIG. 1 and FIG. 4, FIG. 1 is a schematic outside view of a card reader 100, and FIG. 4 is a schematic sectional side view of the card reader 100. In an embodiment of the card reader 100 in the present invention, the card reader 100 is used for card swiping and card inserting, and can be applied to the consumption using a credit card or the use of a card reader of an access control card.

Figure 2A:
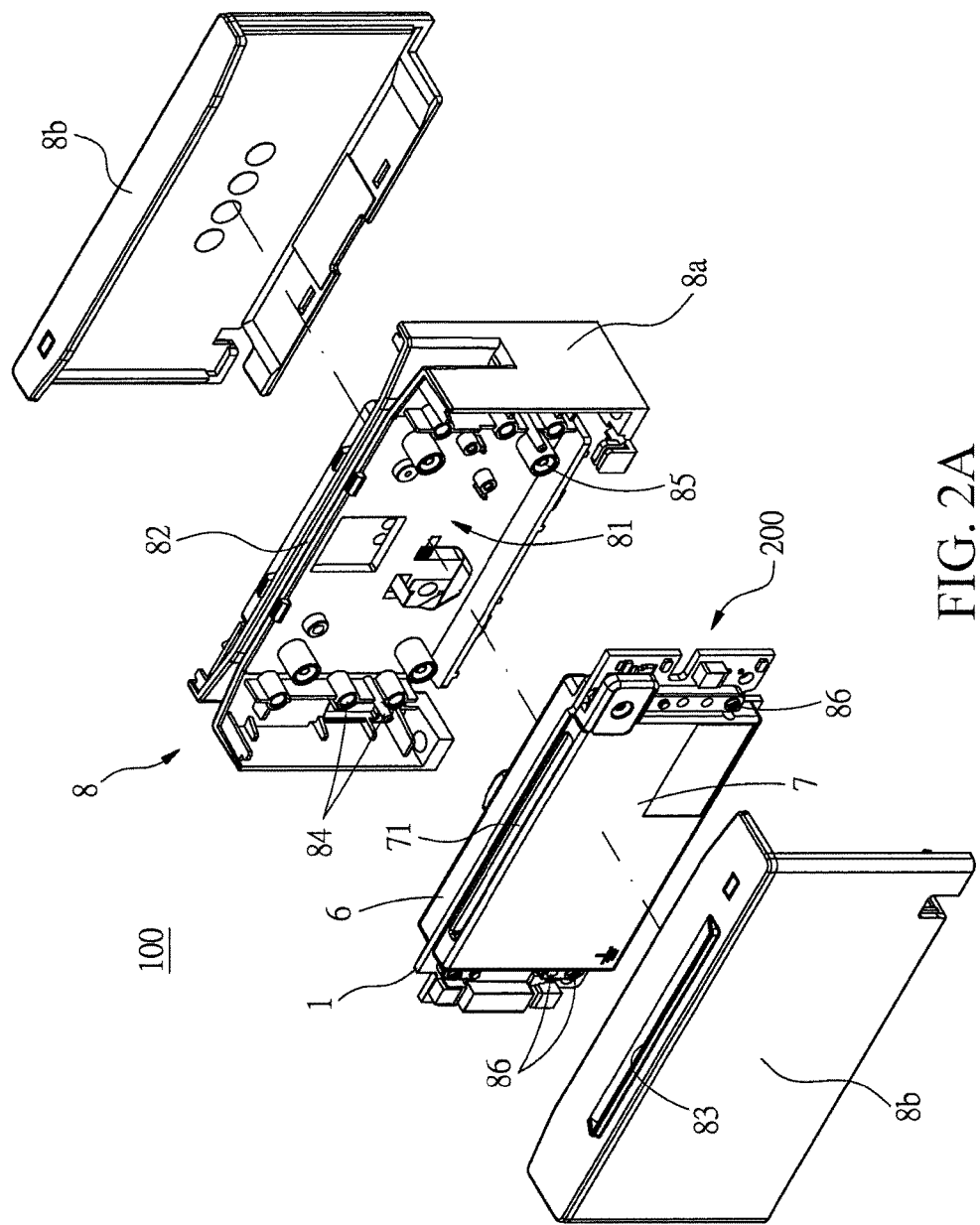
FIG. 2A is a schematic exploded front view of a card reader according to an embodiment of the present invention.
Figure 2B:
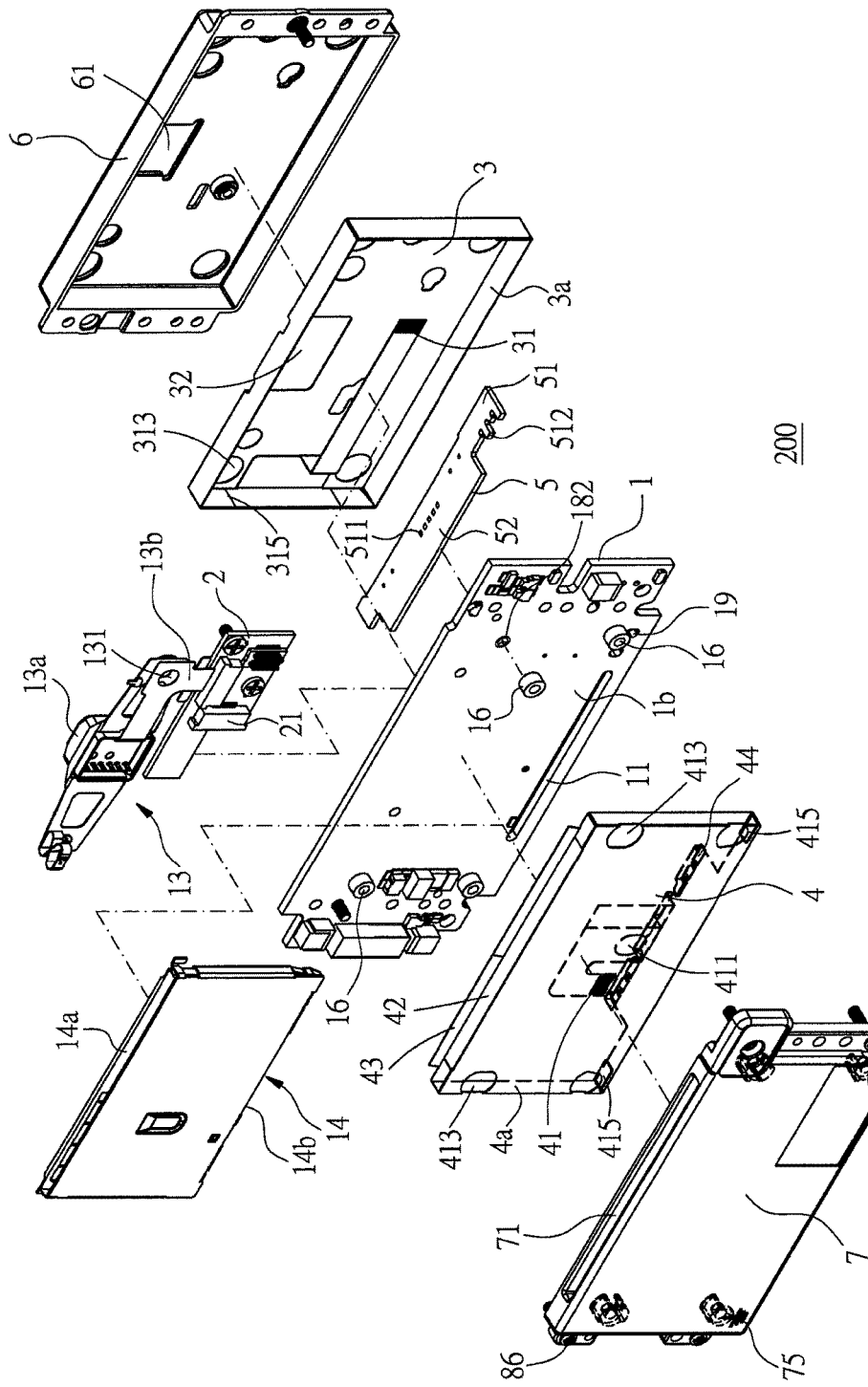
FIG. 2B is a schematic exploded front view of an electronic protection module according to an embodiment of the present invention.
Figure 2C:
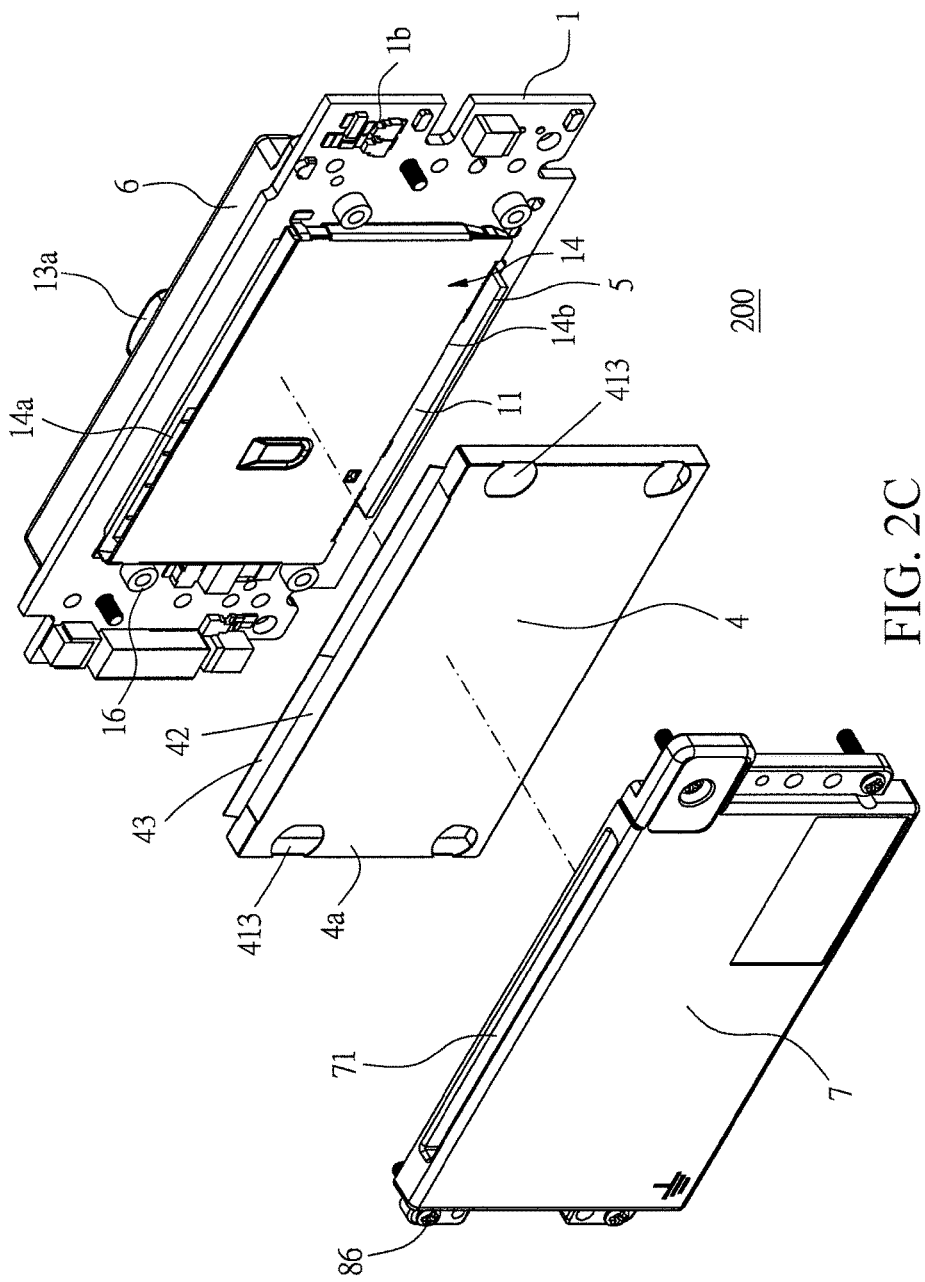
FIG. 2C is a partially exploded schematic front view of an electronic protection module according to an embodiment of the present invention.
Figure 2D:
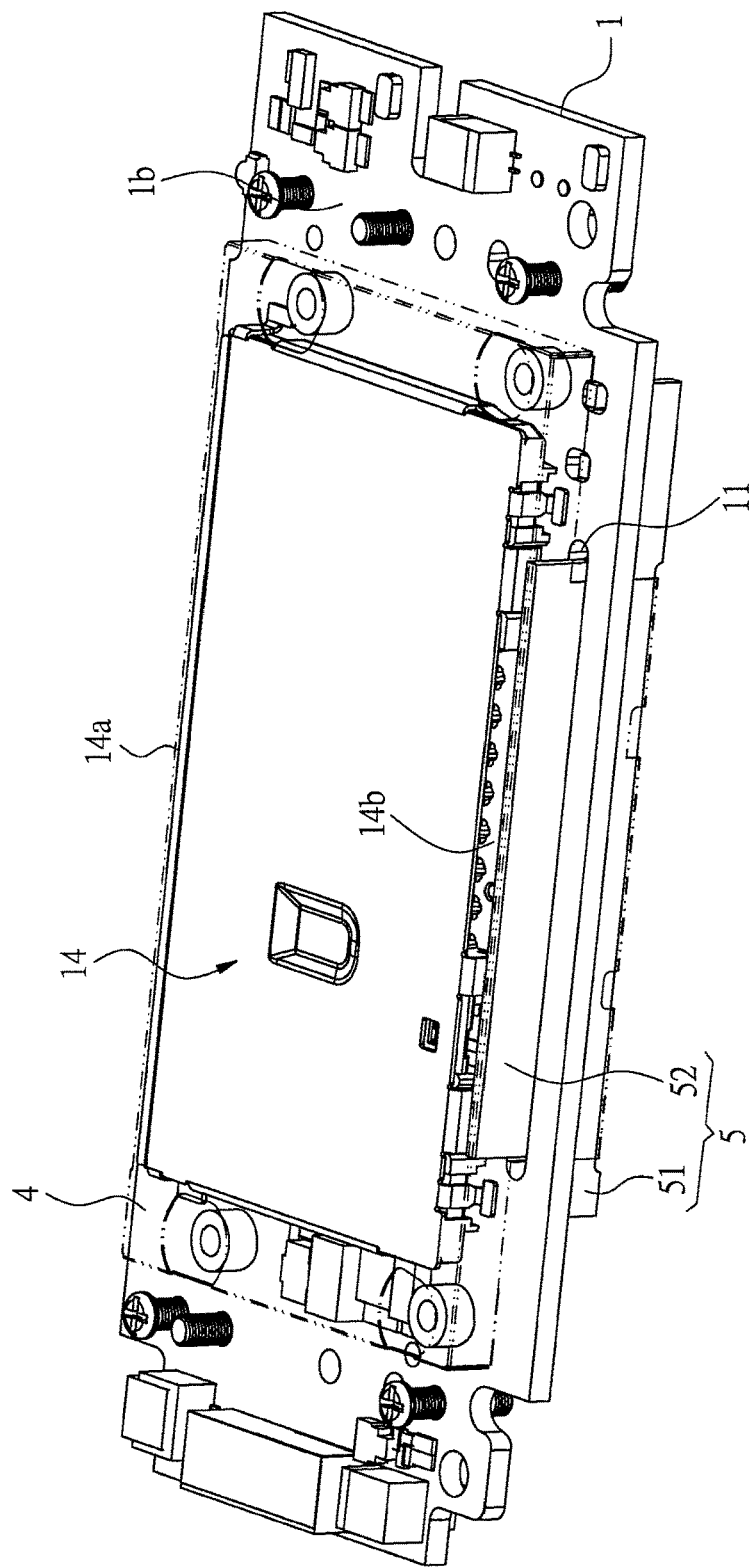
FIG. 2D is a schematic outside view showing that a chip-card signal reading element is assembled to a second surface according to an embodiment of the present invention.
Figure 3A:
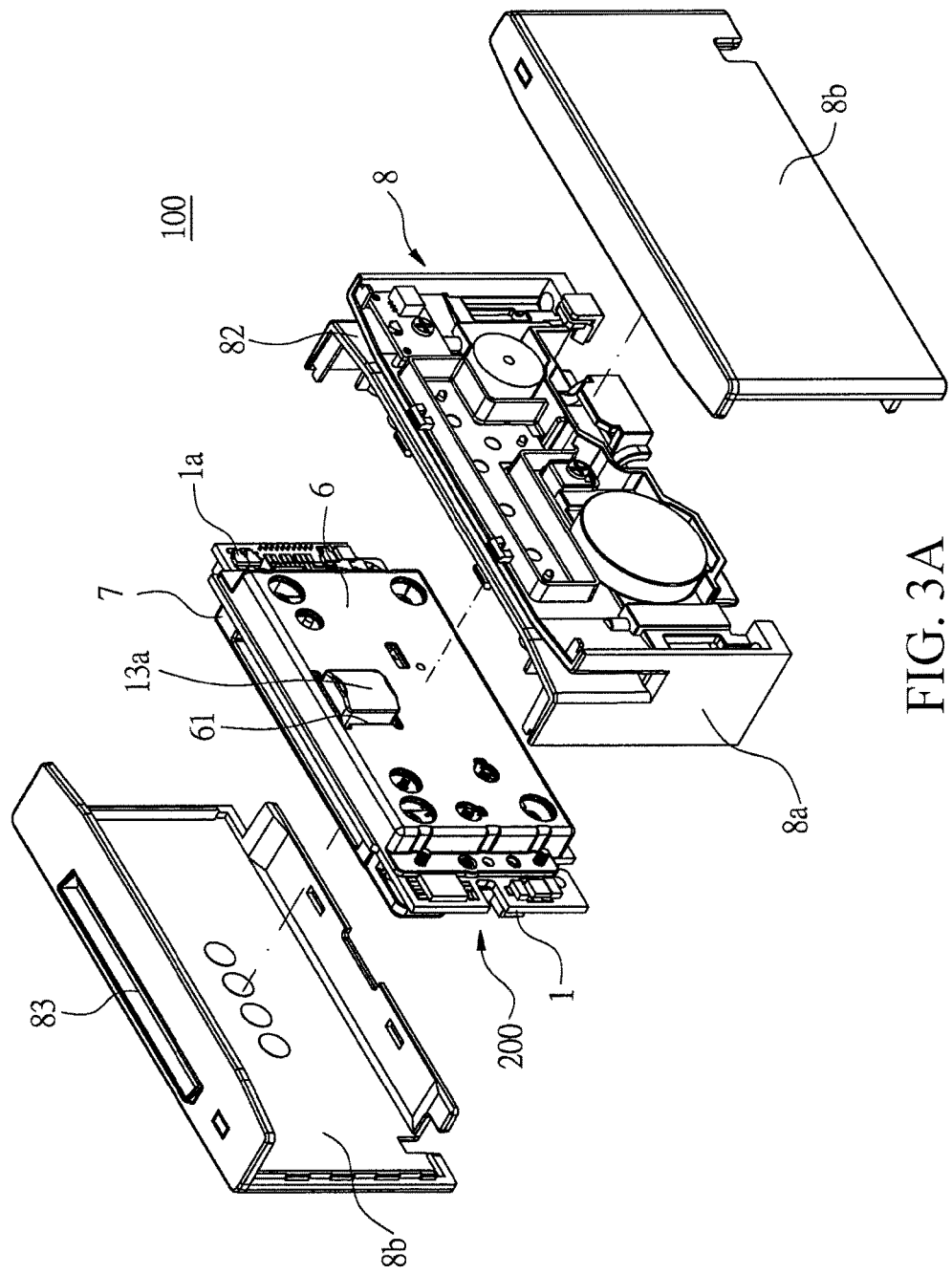
FIG. 3A is a schematic exploded rear view of a card reader according to an embodiment of the present invention.
Figure 3B:
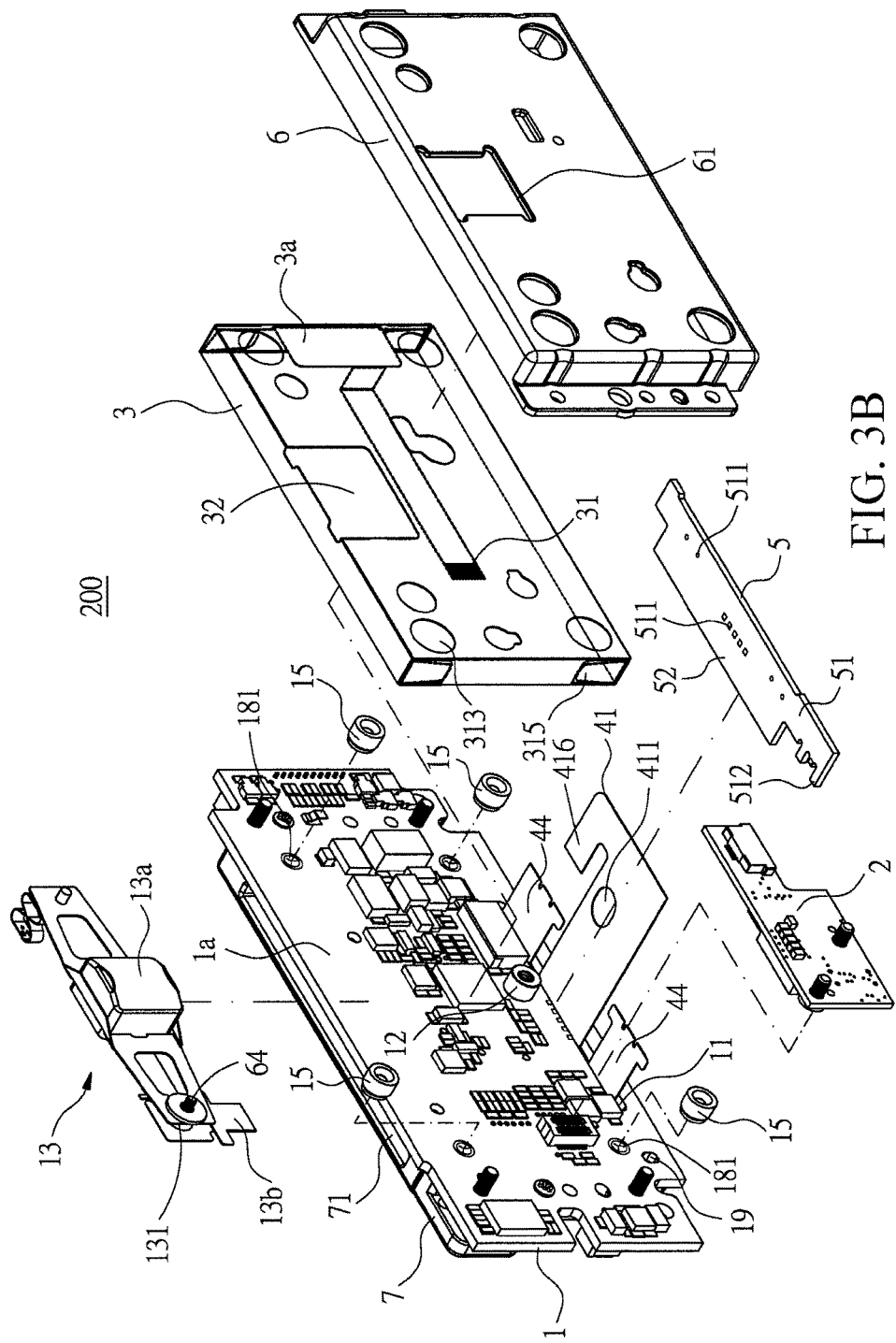
FIG. 3B is a schematic exploded rear view of an electronic protection module according to an embodiment of the present invention.
Figure 3C:
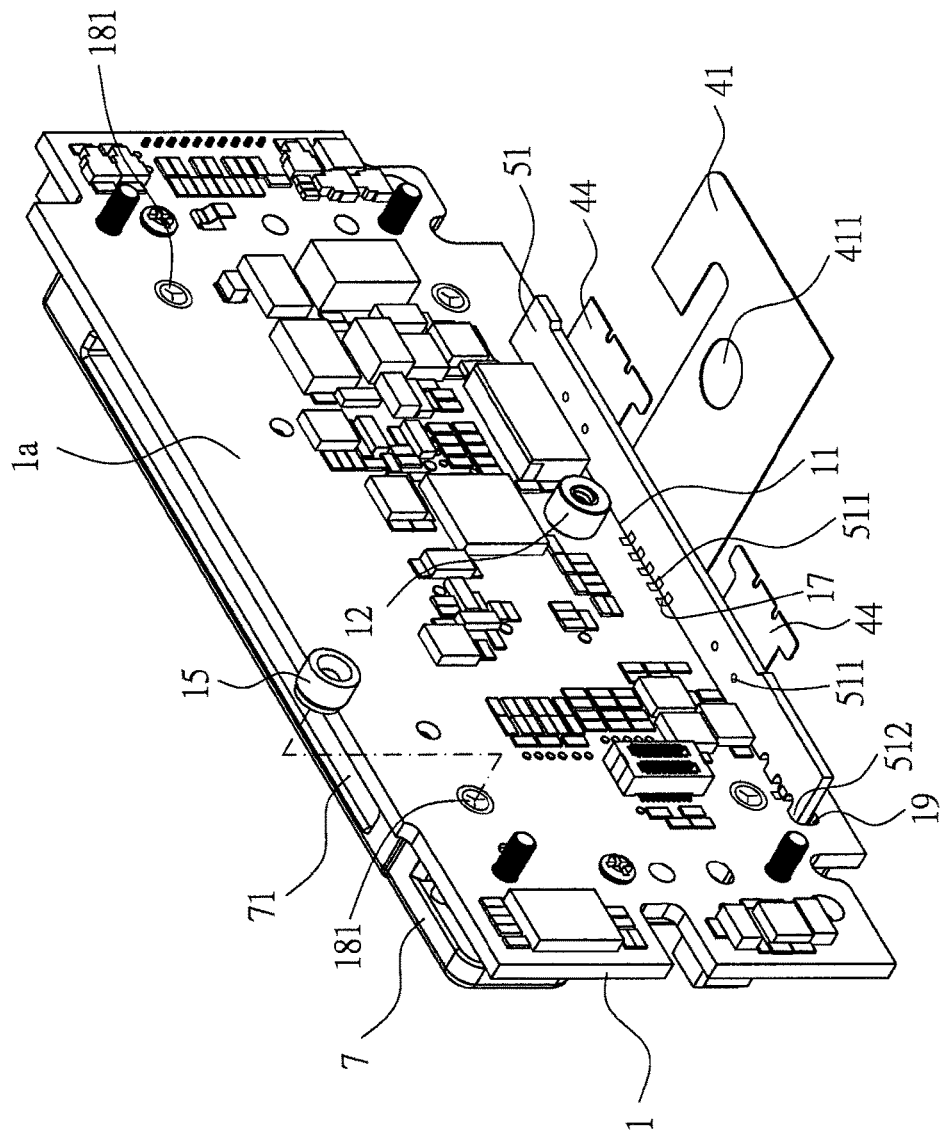
FIG. 3C is a schematic partial appearance view of assembling a second terminal according to an embodiment of the present invention.

Referring to FIG. 2A, FIG. 2B, FIG. 3A, and FIG. 3B, FIG. 2A is a schematic exploded front view of the card reader 100, FIG. 2B is a schematic exploded front view of an electronic protection module 200, FIG. 3A is a schematic exploded rear view of the card reader 100, and FIG. 3B is a schematic exploded rear view of the electronic protection module 200. In this embodiment, the card reader 100 is a portable and short rectangular electronic apparatus. The card reader 100 includes a housing 8 and the electronic protection module 200. The housing 8 includes a central housing 8a, a left outer cover 8b, and a right outer cover 8b. A card swiping slot 82 and a card inserting slot 83 are adjacently disposed on a side wall surface of the housing 8. An accommodation area 81 is formed in the housing 8 between the central housing 8a and the left outer cover 8b. An opening of the card inserting slot 83 is formed on a side wall of the left outer cover 8b. The card swiping slot 82 is groove-structured and is located on the central housing 8a. That is, the card inserting slot 83 and the card swiping slot 82 are adjacently disposed on a side wall. In addition, the card swiping slot 82 and the card inserting slot 83 are communicated with the accommodation area 81 in the housing 8.

Referring to FIG. 2A, FIG. 2B, FIG. 3A, FIG. 3B, and FIG. 4, the electronic protection module 200 is disposed in the accommodation area 81. A side of the electronic protection module 200 includes a magnetic-card signal reading element 13, and another side of the electronic protection module 200 includes a chip-card signal reading element 14.

A magnetic head 13a of the magnetic-card signal reading element 13 is located in the card swiping slot 82 to read card information.

Figure 6:
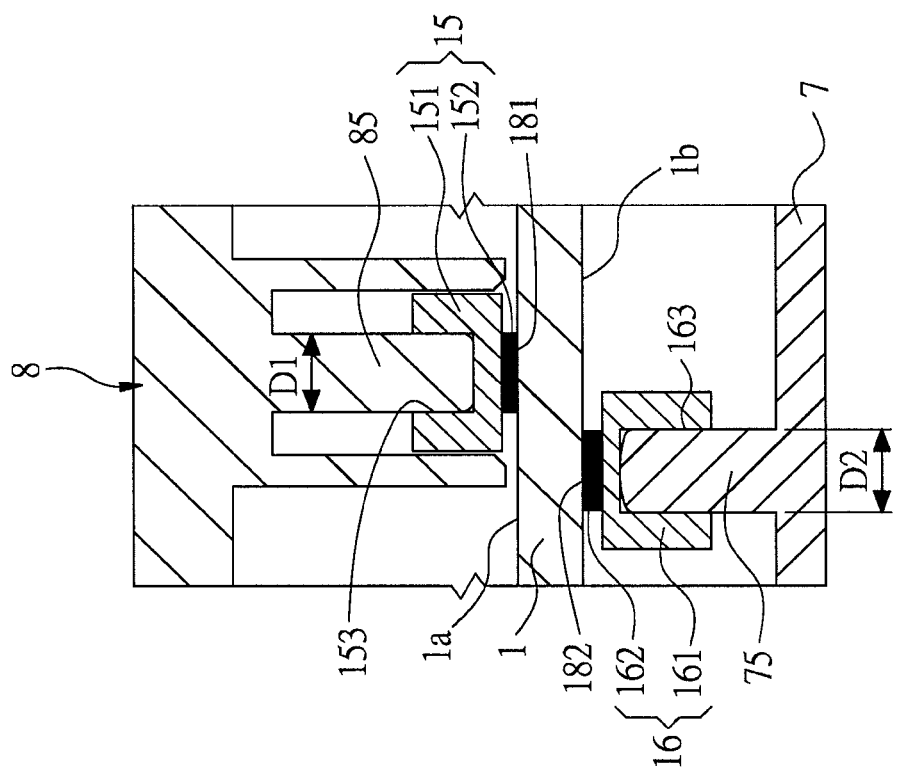
FIG. 6 is a partially enlarged view showing that a first communicated piece and a second communicated piece are in contact with a circuit substrate according to an embodiment of the present invention.

Referring to FIG. 2A, FIG. 2B, FIG. 3A, and FIG. 3B, the housing 8 includes a plurality of fixed columns 85 located in the accommodation area 81, that is, the plurality of fixed columns 85 protrudes from an inner side wall surface of the housing 8. The fixed columns 85 respectively pass through first holes 313 of the first soft circuit board 3. An end of each first communicated piece 15 is positioned on one of the fixed columns 85 (as shown in FIG. 6). Each first communicated piece 15 is fixed in a groove of one of the fixed columns 85, to enhance the stability of a connection between each first communicated piece 15 and a first connection point 181.

Referring to FIG. 2A, FIG. 2B, FIG. 3A, and FIG. 3B, a circuit substrate 1, a first outer cover 6, and a second outer cover 7 are separately locked and connected by using a plurality of connection pieces 86, so that the magnetic-card signal reading element 13 and the chip-card signal reading element 14 are fixed on the circuit substrate 1. The connection pieces 86 are fixed on positioning columns 84 through two side holes of the housing 8. In this way, components such as the electronic protection module 200 are assembled to the central housing 8a based on the central housing 8a of the housing 8, improving the integrity, stability, convenience of assembly of the components such as the electronic protection module 200, and avoiding the problem that the components are not integrally assembled to the central housing 8a, and consequently other components are not jointly moved when any component is invaded, a loop protection program is not triggered, and the circuit substrate 1 is connected or invaded in another manner.

Referring to FIG. 2B and FIG. 3B, the electronic protection module 200 includes the circuit substrate 1, the first outer cover 6, the second outer cover 7, a plurality of first communicated pieces 15, a plurality of second communicated pieces 16, the first soft circuit board 3, a second soft circuit board 4, and a baffle 5.

Figure 3D:
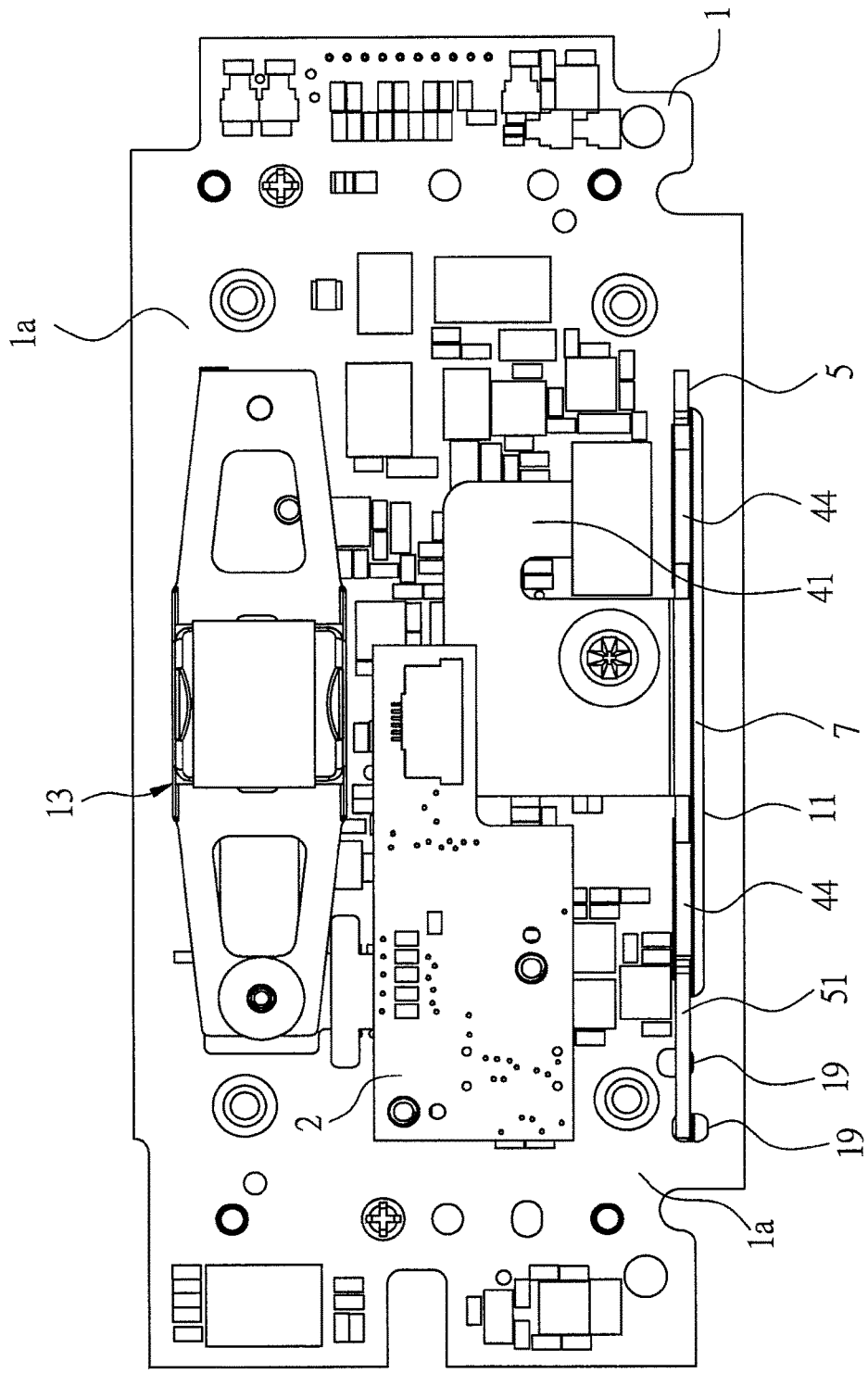
FIG. 3D is a schematic front view of assembling a second terminal according to an embodiment of the present invention.
Figure 3E:
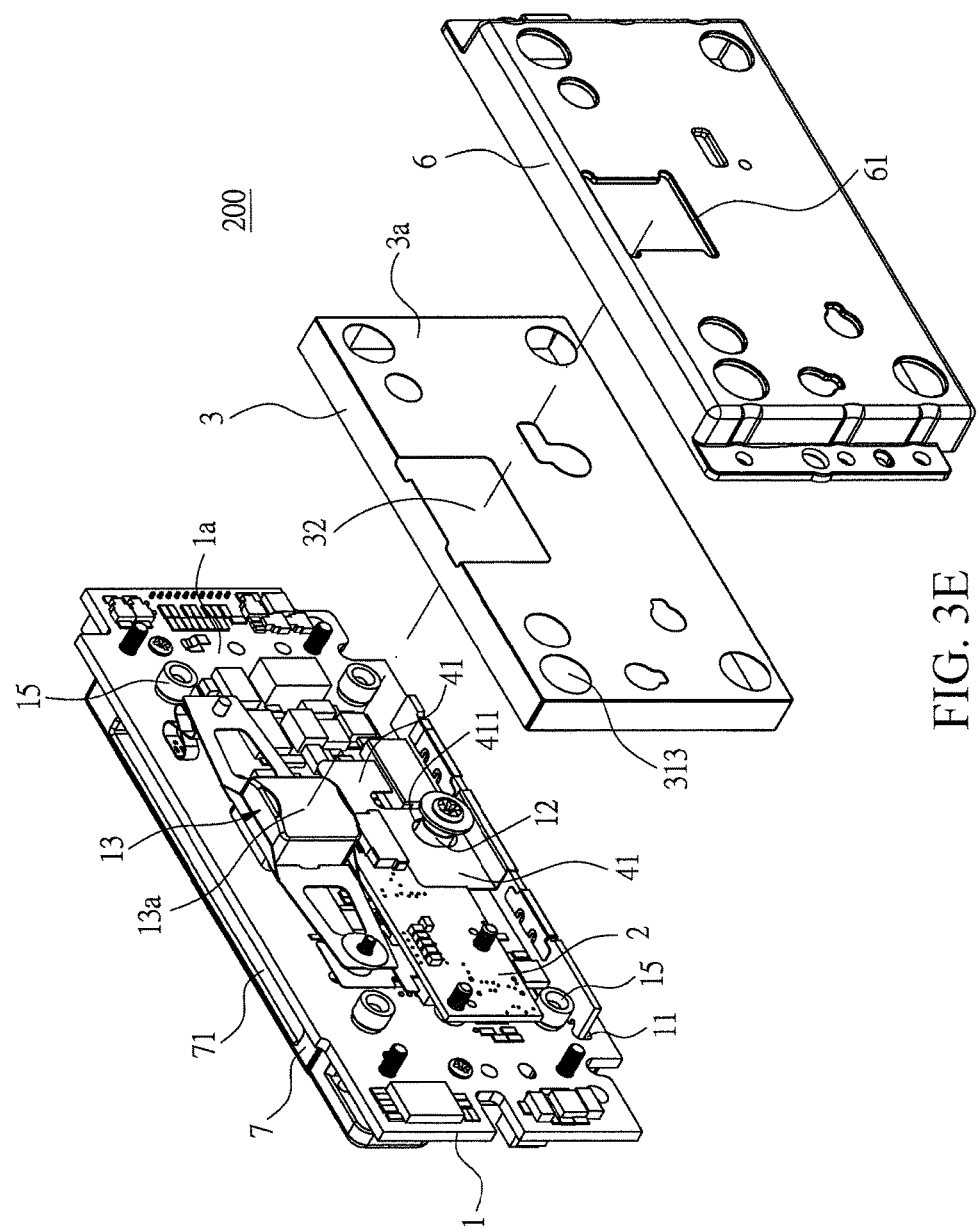
FIG. 3E is a partially exploded schematic rear view of an electronic protection module according to an embodiment of the present invention.

Referring to FIG. 2B, FIG. 2C, FIG. 3B, and FIG. 3E, FIG. 2C is a partially exploded schematic front view of the electronic protection module, and FIG. 3E is a partially exploded schematic rear view of the electronic protection module. In this embodiment, a first surface 1a of the circuit substrate 1 faces an inner side wall surface of the central housing 8a, and a second surface 1b of the circuit substrate 1 faces an inner side wall surface of the left outer cover. The circuit substrate 1 basically abuts against the positioning columns 84. In addition, the magnetic-card signal reading element 13 is disposed on the first surface 1a (referring to FIG. 5 together), and the chip-card signal reading element 14 is disposed on the second surface 1b. The chip-card signal reading element 14 is an electrical receptacle connector, and an opening of a slot 14a of the chip-card signal reading element 14 corresponds to the opening of the card inserting slot 83.

Referring to FIG. 2B, FIG. 2C, FIG. 3B, and FIG. 3E, a connecting terminal 13b extends from the magnetic-card signal reading element 13, and is a soft circuit board. A plurality of wire loops is deployed on the connecting terminal 13b, and functions as a secure line. If a line of the connecting terminal 13b is short-circuited or disconnected, a loop protection program of an electronic circuit element is driven, resulting in a disconnection or a short-circuit of a signal loop.

Referring to FIG. 2B, FIG. 2C, FIG. 3B, and FIG. 3E, a fixed hole 131 is formed through the connecting terminal 13b at a corner. A fixture 64 (as shown in FIG. 3B) extends from the first outer cover 6 to be locked into the fixed hole 131. When an external force is applied to the magnetic-card signal reading element 13 to pull the connecting terminal 13b, the connecting terminal 13b is fixed by using the fixture 64, to prevent the connecting terminal 13b from being easily pulled and avoid information stealing.

Referring to FIG. 2B, FIG. 2C, FIG. 3B, and FIG. 3E, the magnetic-card signal reading element 13 is electrically connected to a conversion board 2 by using the connecting terminal 13b, and the conversion board 2 interconnects with the circuit substrate 1, so that the magnetic-card signal reading element 13 is electrically connected to the circuit substrate 1 by using the conversion board 2.

Referring to FIG. 2B, FIG. 2C, FIG. 3B, and FIG. 3E, the first surface 1a and the second surface 1b of the circuit substrate 1 respectively include a plurality of first connection points 181 and a plurality of second connection points 182. Each of the second connection points 181 and each of the second connection points 182 are respectively connected to one end of one of the plurality of first communicated pieces 15 and one end of one of the plurality of second communicated pieces 16. The first connection points 181 and the second connection points 182 each include a first sensing point, a second sensing point, and a third sensing point at intervals. The first sensing point and the second sensing point form two independent loops A and B (a positive signal and a negative signal). The third sensing point forms a ground loop C (a ground signal).

In this embodiment, when the first connection points 181 or the second connection points 182 are connected by a conductive substance (such as a conductive liquid), a loop between the third sensing point and the first sensing point or a loop between the third sensing point and the second sensing point is short-circuited. In addition, when the first communicated piece 15 and the second communicated piece 16 are respectively connected to the first sensing point and the second sensing point, the signal loop is switched on. If any loop is open-circuit or disconnected, a mechanism of the loop protection program is started.

The mechanism of the protection program in this embodiment includes the following modes: First, a microprocessor chip on the circuit substrate 1 can clear a stored transaction key. When used for a card reading transaction, the transaction key is used for mutual authentication with a bank. When the transaction key does not exist, the card reader 100 cannot perform the transaction. Second, a microprocessor chip on the circuit substrate 1 can disable all input functions, for example, keyboard input and card reading functions, of the card reader 100. Third, the card reader 100 or a display of a cash register externally connected to the card reader 100 may display a warning that the card reader 100 is attacked.

Referring to FIG. 2A, FIG. 2B, FIG. 2C, FIG. 3B, and FIG. 3E, the first surface 1a of the circuit substrate 1 is connected to one end of each of the plurality of first communicated pieces 15, and the second surface 1b of the circuit substrate 1 is connected to one end of each of the plurality of second communicated pieces 16. An inner side of the housing 8 abuts against the other end of each of the plurality of first communicated pieces 15, an inner side of the second outer cover 7 abuts against the other end of each of the plurality of second communicated pieces 16, and one end of each of the second communicated pieces 16 locates one column 75 of the second outer cover 7. When the housing 8 is pried off, an end of each of the plurality of first communicated pieces 15 is separated from the first connection point 181 on the first surface 1a, to form an open-circuit indicating a disconnected state, and the loop protection program is started. Alternatively, when the second outer cover 7 is pried off, an end of each of the plurality of second communicated pieces 16 is separated from the second surface 1b, to form an open-circuit indicating a disconnected state, and the loop protection program is started. In addition, the first outer cover 6 and the second outer cover 7 are housings that can be made of metal (or steel) materials. The use of the first outer cover 6 and the second outer cover 7 that are made of the metal materials enhances the structure strength and a function of preventing from being easily invaded and damaged.

Referring to FIG. 2B, FIG. 2C, FIG. 3B, and FIG. 3E, the circuit substrate 1 is a multi-layer circuit board and is provided with electronic elements such as a microprocessor chip, a memory, a battery, and electrical connectors of various specifications.

Referring to FIG. 2B, FIG. 2C, FIG. 3B, and FIG. 3E, the circuit substrate 1 is not deployed with a plurality of wire meshes. The first soft circuit board 3 and the second soft circuit board 4 respectively cover the first surface 1a and the second surface 1b, to achieve a coating function of a stereoscopic box shape, that is, the two surfaces of the circuit substrate 1 are covered for protection. When the first soft circuit board 3 or the second soft circuit board 4 is invaded, the loop protection program is started.

Referring to FIG. 2B, FIG. 2C, FIG. 3B, and FIG. 3E, the circuit substrate 1 includes a groove 11 and a lock column 12. The groove 11 passes through the circuit substrate 1 from the first surface 1a to the second surface 1b, and the lock column 12 is adjacent to the groove 11 and is located on the first surface 1a. A limiting hole 411 passes through a second terminal 41, the second terminal 41 passes through the groove 11 from the second surface 1b to the first surface 1a, and the second terminal 41 is connected to an electrical receptacle connector on the first surface 1a. The lock column 12 is placed into the limiting hole 411 to fasten the second terminal 41. The second terminal 41 is fixed by using the lock column 12, to prevent the second terminal 41 from being pulled out and accordingly avoid damage to the protection mechanism of the second soft circuit board 4.

Referring to FIG. 2B, FIG. 2C, FIG. 3B, FIG. 3E, and FIG. 6, FIG. 6 is a partially enlarged view showing that the first communicated piece and the second communicated piece are in contact with the circuit substrate. In this embodiment, the plurality of first communicated pieces 15 and the plurality of second communicated pieces 16 are conductive rubbers of a cylindrical shape. In this embodiment, the first communicated piece 15 includes a body 151 and a conductive end 152. The second communicated piece 16 includes a body 161 and a conductive end 162. The width D1 of the conductive end 152 is 1 mm to 3 mm, and is preferably 2 mm. The width D2 of the conductive end 162 is 1 mm to 3 mm, and is preferably 2 mm.

Referring to FIG. 2B, FIG. 2C, FIG. 3B, FIG. 3E, and FIG. 6, the body 151 of each first communicated piece 15 has a groove 153 extended by the fixed column 85 to locate. The fixed column 85 abuts against an inner surface of the groove 153. When the housing 8 is externally invaded, a tool drills from the fixed column 85 into the body 151. When the tool is removed and a conductive substance is ready to be injected into the first connection point 181, the body 151 is moved when the tool is removed. Consequently, the conductive end 152 jointly moves on the first connection point 181, and the conductive end 152 is not in absolute contact with the first connection point 181. Therefore, the first sensing point and the second sensing point of the first connection point 181 is in an open-circuit indicating a disconnected state, and the loop protection program is started. The width D1 of an inside diameter of the groove is 1 mm to 3 mm, and is preferably 2 mm.

Referring to FIG. 2B, FIG. 2C, FIG. 3B, FIG. 3E, and FIG. 6, the body 161 of each second communicated piece 16 has a groove 163 extended by the column 75 to locate. The column 75 abuts against an inner surface of the groove 163. When the second outer cover 7 is externally invaded, a tool drills from the column 75 into the body 161. When the tool is removed and a conductive substance is ready to be injected into the second connection point 182, the body 161 is moved when the tool is removed. Consequently, the conductive end 162 jointly moves on the first connection point 182, and the conductive end 152 is not in absolute contact with the second connection point 182. Therefore, the first sensing point and the second sensing point of the second connection point 182 is in an open-circuit indicating a disconnected state, and the loop protection program is started. The width D2 of an inside diameter of the groove is 1 mm to 3 mm, and is preferably 2 mm.

Figure 5:
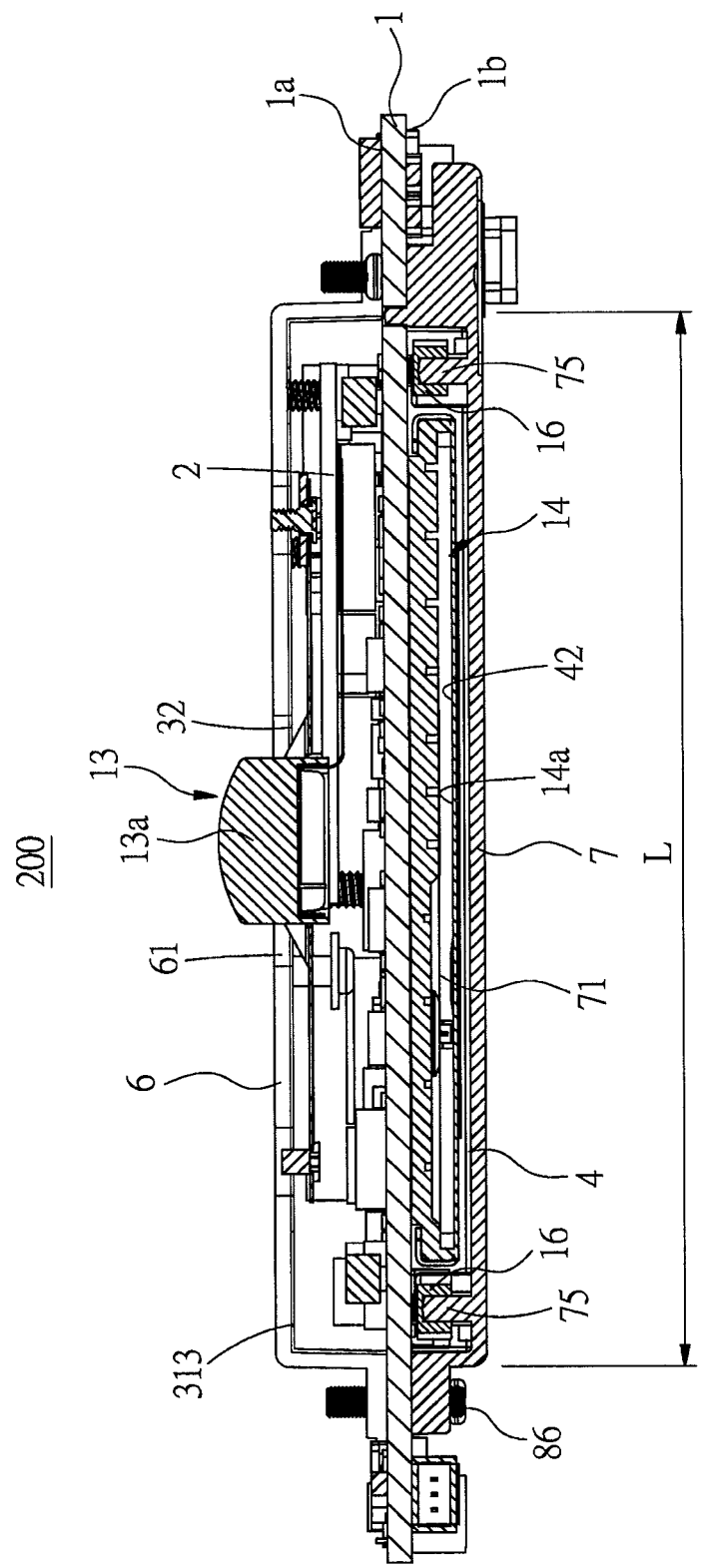
FIG. 5 is a schematic sectional side view of an electronic protection module according to an embodiment of the present invention.

Referring to FIG. 2B, FIG. 3B, and FIG. 5, FIG. 5 is a schematic sectional side view of the electronic protection module. In this embodiment, the first soft circuit board 3 is a multi-layer circuit board, and is deployed with a plurality of wire loops. Lines that are in vertical wrapped connection in sequence are disposed on one layer, and lines that are in horizontal wrapped connection in sequence are disposed on another layer. The lines of the multi-layer circuit board are alternately formed, and function as secure lines. When the multi-layer circuit board is damaged, if the line of the first soft circuit board 3 is short-circuited or disconnected, the loop protection program of the electronic circuit element is driven, resulting in a disconnection or a short-circuit of the signal loop.

Referring to FIG. 2B, FIG. 2C, FIG. 3B, and FIG. 3E, the first soft circuit board 3 is bent to a recessed box structure, and is attached to an inner surface of the first outer cover 6. In this case, the first soft circuit board 3 forms a first box 3a, one side of the first box 3a has a first opening 32 and a plurality of first holes 313, and the first opening 32 corresponds to a first through hole 61 of the first outer cover 6. The magnetic head 13a of the magnetic-card signal reading element 13 passes through the first opening 32 of the first soft circuit board 3 and extends into the card swiping slot 82 (referring to FIG. 4 and FIG. 5 together). The first soft circuit board 3 covers the first surface 1a, and a side end of the first soft circuit board 3 includes a first terminal 31. The first terminal 31 extends to the first surface 1a to be connected to a connection port 21 of the conversion board 2 (referring to FIG. 2B together). The first terminal 31 is located in the first box 3a and is covered, to avoid the possibility that the first terminal 31 is easily invaded when being disposed outside the first box 3a.

Referring to FIG. 2B, FIG. 2C, FIG. 3B, and FIG. 3E, the first soft circuit board 3 includes a plurality of first overlapped areas 315 located at four corners of the first soft circuit board 3. In other words, the first overlapped areas 315, that is, the four corners of the first soft circuit board 3 are thickened to form a dual-layer wire mesh, thereby improving a protection function of the first soft circuit board 3.

Referring to FIG. 2B, FIG. 2C, FIG. 3B, FIG. 3E, and FIG. 5, the second soft circuit board 4 is a multi-layer circuit board, and is deployed with a plurality of wire loops. Lines that are in vertical wrapped connection in sequence are disposed on one layer, and lines that are in horizontal wrapped connection in sequence are disposed on another layer. The lines of the multi-layer circuit board are alternately formed, and function as secure lines. If the line of the second soft circuit board 4 is short-circuited or disconnected, the loop protection program of the electronic circuit element is driven, resulting in a disconnection or a short-circuit of the signal loop.

Referring to FIG. 2B, FIG. 2C, FIG. 3B, and FIG. 3E, the second soft circuit board 4 is bent to a recessed box structure, and is adhered to an inner surface of the second outer cover 7. In this case, the second soft circuit board 4 forms a second box 4a. One side of the second box 4a has a second opening 42 and a plurality of second holes 413, and the second opening 42 corresponds to a plurality of second through holes 71 of the second outer cover 7. The slot 14a of the chip-card signal reading element 14 corresponds to the second opening 42 of the second soft circuit board 4, the plurality of second holes 413 are disposed corresponding to locations of the second communicated pieces 16, and the plurality of columns 75 respectively passes through the plurality of second holes 413. The second soft circuit board 4 covers the second surface 1b, and a side end of the second soft circuit board 4 includes a second terminal 41. The second terminal 41 is located in the first box 3a and is covered, to avoid the possibility that the second terminal 41 is easily invaded when being disposed outside the first box 3a.

Referring to FIG. 2B, FIG. 3B, FIG. 3C, and FIG. 3D, FIG. 3D is a schematic front view of assembling the second terminal. The second soft circuit board 4 includes a plurality of welded pads 44 located on two sides of the second terminal 41. In this embodiment, the second terminal 41 and the plurality of welded pads 44 pass through the groove 11 from the second surface 1b to the first surface 1a. The second terminal 41 is plug-connected to the electrical receptacle connector on the first surface 1a of the circuit substrate 1. The second terminal 41 is electrically connected to the circuit substrate 1.

Referring to FIG. 2B, FIG. 2C, FIG. 3B, and FIG. 3E, the second soft circuit board 4 includes a plurality of second overlapped areas 415 located at four corners of the second soft circuit board 4. In other words, the second overlapped areas 415 are formed by thickening the four corners of the second soft circuit board 4, to form a dual-layer wire mesh, thereby improving a protection function of the second soft circuit board 4.

Referring to FIG. 2B, FIG. 2C, FIG. 3B, and FIG. 3E, the second soft circuit board 4 includes a transition portion 43. The transition portion 43 is located at the second opening 42 of the second box 4a. One surface of the transition portion 43 abuts against the second surface 1b, and the other surface of the transition portion 43 abuts against a side surface of the second outer cover 7 on a side of the second through hole 71. The transition portion 43 increases a protection area, to improve the protection function of the second soft circuit board 4, thereby avoiding the possibility that the circuit substrate 1 is invaded from the second through hole 71 of the second outer cover 7.

Referring to FIG. 2B, FIG. 2C, FIG. 3B, and FIG. 3E, the first outer cover 6 is of a box structure, and the first outer cover 6 is disposed on the first surface 1a. The first soft circuit board 3 is adhered to an inner side of the first outer cover 6, and the first outer cover 6 includes the first through hole 61. The magnetic-card signal reading element 13 is located in the first through hole 61, and the magnetic head 13a of the magnetic-card signal reading element 13 passes through the first through hole 61.

Referring to FIG. 2B, FIG. 2C, FIG. 3B, FIG. 3E, FIG. 5, and FIG. 6, the first communicated pieces 15 abut against the fixed columns 85 of the housing 8 and are closely adhered to the first connection points 181. The fixed columns 85 respectively pass through the first holes 313 of the first soft circuit board 3, and the first sensing point and the second sensing point of the first connection point 181 are connected by using the first communicated pieces 15.

If the fixed columns 85 are damaged from outside of the housing 8, the fixed columns 85 are drilled and moved, and the first communicated pieces 15 are jointly moved. Consequently, an end of each first communicated piece 15 is separated from the first surface 1a, and the first communicated piece 15 is not absolutely connected to the first connection point 181, the first sensing point and the second sensing point of the first connection point 181 are in an open-circuit indicating a disconnected state, and the loop protection program is started. By means of this design, an effect of enabling a protection function in time is improved when the housing 8 is damaged.

Referring to FIG. 2B, FIG. 2C, FIG. 3B, and FIG. 3E, the second outer cover 7 is of a box structure, and the second outer cover 7 covers the second soft circuit board 4. In other words, the second outer cover 7 is disposed on the second surface 1b, and the chip-card signal reading element 14 is disposed inside the second outer cover 7. In addition, the second soft circuit board 4 is adhered to an inner side surface of the second outer cover 7. The second outer cover 7 includes the second through hole 71 and the plurality of columns 75. The second through hole 71 corresponds to the slot 14a of the chip-card signal reading element 14. The plurality of columns 75 protrudes from the inner side surface of the second outer cover 7. The second communicated pieces 16 are respectively sleeved outside the columns 75, to improve the stability of contact between the second communicated pieces 16 and the second connection points 182.

Referring to FIG. 2B, FIG. 2C, FIG. 3B, and FIG. 3E, the second communicated pieces 16 abut against the columns 75 of the second outer cover 7 and are closely adhered to the second connection points 182, and the first sensing point and the second sensing point of the second connection point 182 are connected by using the second communicated pieces 16 to form a conductive loop. If the second outer cover 7 is moved, the second communicated pieces 16 are jointly moved, so that one end of each of the second communicated piece 16s is separated from the second surface 1b. The second communicated piece 16 and the second connection point 182 are not in absolute contact with the second connection point 182, so that the first sensing point and the second sensing point of the second connection point 182 are in an open-circuit indicating a disconnected state, and the loop protection program is started. In addition, the columns 75 and the second communicated pieces 16 respectively pass through the second holes 413 of the second soft circuit board 4. If the columns 75 are drilled or moved, the second communicated piece 16 and the second connection point 182 are not in absolute contact, so that the first sensing point and the second sensing point of the second connection point 182 are in an open-circuit indicating a disconnected state, and the loop protection program is started.

Referring to FIG. 2B, FIG. 2C, FIG. 3B, and FIG. 5, the length L of the second outer cover 7 is actually equal to the length L of the first outer cover 6, the second outer cover 7 covers the second surface 1b and is disposed corresponding to the length of the first outer cover 6. The first outer cover 6 and the second outer cover 7 cover two sides of the circuit substrate 1 by the same length, the possibility that the first outer cover 6 and the second outer cover 7 easily drill from one surface of the circuit substrate 1 into another surface if not having a symmetric length is avoided.

Referring to FIG. 2B, FIG. 2C, FIG. 3B, and FIG. 3E, the electronic protection module 200 further includes the conversion board 2. One end of the conversion board 2 is connected to the first surface 1a of the circuit substrate 1, and the other end of the conversion board 2 is connected to the magnetic-card signal reading element 13. During assembly, the first terminal 31 of the first soft circuit board 3 may be connected to an electric connector on the conversion board 2, and the electrical plug on the conversion board 2 is aligned with the electrical receptacle connector on the first surface 1a for simple connection, to provide the convenience of the assembly.

Referring to FIG. 2B, FIG. 2C, FIG. 2D, FIG. 3B, FIG. 3C, FIG. 3D, and FIG. 3E, FIG. 2D is a schematic outside view showing that the chip-card signal reading element is assembled to the second surface. In this embodiment, the baffle 5 is a multi-layer circuit board, is deployed with a plurality of wire loops, and has a function of a secure line. If the baffle 5 is damaged, the line in the baffle 5 is short-circuited or disconnected, and the loop protection program of the electronic circuit element is driven, resulting in a disconnection or a short-circuit of the signal loop.

Referring to FIG. 2B, FIG. 2C, FIG. 2D, FIG. 3B, FIG. 3C, FIG. 3D, and FIG. 3E, in this embodiment, the baffle 5 is a board of a T shape. The baffle 5 includes a wide board 51 and a narrow board 52. The narrow board 52 on one end of the baffle 5 passes through the groove 11 to a rear side of the chip-card signal reading element 14, and the width of the wide board 51 on the other end of the baffle 5 is greater than the width of the groove 11, so that the wide board 51 is stuck and fixed on the first surface 1a. In other words, the wide board 51 is located on the first surface 1a of the circuit substrate 1, the narrow board 52 is located on the second surface 1b of the circuit substrate 1, and the baffle 5 is perpendicular to the circuit substrate 1.

Referring to FIG. 2B, FIG. 2C, FIG. 2D, FIG. 3B, FIG. 3C, FIG. 3D, and FIG. 3E, the baffle 5 is fixed in the groove 11, and one end of the baffle 5 extends to the rear side of the chip-card signal reading element 14 for covering the rear side of the chip-card signal reading element 14 to avoid the possibility that the rear side of the chip-card signal reading element 14 is invaded. In this case, the chip-card signal reading element 14 forms an electrical receptacle connector, and has a plurality of terminals for transmitting signals. The location in which the circuit board is welded at the rear of the electrical receptacle connector is of a hollow-out structure and exposed with welded pins of the terminals. If not covered by the baffle 5, the rear side of the chip-card signal reading element 14 is easy to be invaded, and the welded pins of the terminals are easy to be connected with a conductive substance (such as a conductive liquid), resulting in information stealing. In addition, although the chip-card signal reading element 14 is covered by the second soft circuit board 4 and the second outer cover 7 for protection, when the second outer cover 7 is damaged and a rear side of the second soft circuit board 4 is turned over, the rear side of the chip-card signal reading element 14 is exposed, resulting in the possibility that the welded pins of the terminals are easy to be connected.

In this embodiment, the baffle 5 is on the circuit substrate 1, and is used for covering the rear side of the chip-card signal reading element 14 for protection, but the position of the baffle 5 is not limited. In some implementation aspects, the baffle 5 may be disposed at any position on the circuit substrate 1, to cover and isolate other elements to be protected on the circuit substrate 1 from an exterior.

Referring to FIG. 2B, FIG. 2C, FIG. 2D, FIG. 3B, FIG. 3C, FIG. 3D, and FIG. 3E, in this embodiment, the width of the narrow board 52 is slightly less than the width of the chip-card signal reading element 14, and the width of the narrow board 52 is greater than the total width of the welded pins of the terminals, to increase coverage and improve a protection effect. The narrow board 52 is located on the second surface 1b of the circuit substrate 1, to play a covering role as a wall, thereby avoiding the possibility that the rear side of the chip-card signal reading element 14 is easily invaded. In addition, the wide board 51 is located on the first surface 1a of the circuit substrate 1, and can also play a covering role as a wall. The wide board 51 covers a side end of the first surface 1a, to cover and isolate electronic circuit elements on the first surface 1a from the exterior, thereby avoiding the possibility that the electronic circuit elements on the first surface 1a are easily invaded and connected.

Referring to FIG. 2B, FIG. 2C, FIG. 2D, FIG. 3B, FIG. 3C, FIG. 3D, and FIG. 3E, in this embodiment, the second terminal 41 passes through the groove 11, and the second terminal 41 covers an outer side of the another end of the baffle 5 and is electrically connected to the baffle. That is, the second terminal 41 covers an outer side of the wide board 51 of the baffle 5, and the welded pads 44 of the second terminal 41 are electrically connected to the inner side of the baffle 5. Specifically, the second terminal 41 and the welded pads 44 extend from an outer side surface of the wide board 51 to an inner side surface of the wide board 51. A plurality of contact points 511 is disposed on the inner side surface of the wide board 51, and each welded pad 44 welds some contact points 511. The contact points 511 on the inner side surface of the wide board 51 face the inner side of the card reader 100, and the contact points 511 cannot be easily connected by damaging from the outside of the card reader 100, that is, the contact points 11 cannot be simply seen by means of the coverage of the wide board 51, thereby improving a protection effect of the card reader 100, and reducing the possibility of being invaded and connected.

Referring to FIG. 2B, FIG. 2C, FIG. 2D, FIG. 3B, FIG. 3C, FIG. 3D, and FIG. 3E, some contact points 511 of the wide board 51 are welded with a plurality of contact points 17 on the circuit substrate 1, so that the baffle 5 is electrically connected to the circuit substrate 1. If the baffle 5 is wrenched, the contact points 511 are separated from the contact points 17 to be in an open-circuit indicating a disconnected state, and the loop protection program is started.

Referring to FIG. 2B, FIG. 2C, FIG. 2D, FIG. 3B, FIG. 3C, FIG. 3D, and FIG. 3E, in this embodiment, the baffle 5 includes a plurality of pins 512 extending outwards from two side ends of the wide board 51. The circuit substrate 1 includes a plurality of buckle holes 19 inserted by the pins 512. In this case, the plurality of buckle holes 19 are alternately arranged at different horizontal axes (as shown in FIG. 3D). The buckle holes 19 are respectively disposed on an upper location and a lower location and one end of each buckle hole intersects with one another. The pins 512 are inserted into intersection locations of the buckle holes 19 at a same horizontal axis. After the pins 51 are inserted into the buckle holes 19, a positioning effect of the baffle 5 on the circuit substrate 1 is ensured.

Referring to FIG. 2B, FIG. 2C, FIG. 2D, FIG. 3B, FIG. 3C, FIG. 3D, and FIG. 3E, the width inside the groove 11 is greater than the thickness of the baffle 5. A side end at the bottom of the second outer cover 7 on the second surface 1b of the circuit substrate 1 is correspondingly disposed at a lower position outside the groove 11. After the narrow board 52 is inserted into the groove 11, a bottom surface of the narrow board 52 abuts against the side end at the bottom of the second outer cover 7. A top surface of the narrow board 52 abuts against an inner side of the groove 11. The upper side and the lower side of the narrow board 52 are closely abutted, to improve the positioning effect of the baffle 5 on the circuit substrate 1. In addition, the contact points 511 are disposed on the inner side surface of the wide board 51 to be welded with the contact points 17 of the circuit substrate 1, to improve the positioning effect of the baffle 5 on the circuit substrate 1.

Referring to FIG. 2B, FIG. 2C, FIG. 2D, FIG. 3B, FIG. 3C, FIG. 3D, and FIG. 3E, in this embodiment, the second terminal 41 of the second soft circuit board 4 and the welded pads 44 on two sides are coated at the side ends of the wide board 5 of the baffle 5. If the baffle 5 is wrenched, the second terminal 41 and the welded pad 44 are relatively triggered. When the welded pads 44 are separated from the contact points 511 on the wide board 51, the contact points 511 is in an open-circuit indicating a disconnected state, and the loop protection program is started.

The baffle extends to the rear side of the chip-card signal reading element, to cover the rear side of the chip-card signal reading element and avoid the possibility that the rear side of the chip-card signal reading element is invaded, thereby improving a protection function on the rear side of the chip-card signal reading element. In this case, the chip-card signal reading element forms an electrical receptacle connector and has a plurality of terminals for transmitting signals. Exposed welded pins of the terminals are located in the location in which the circuit board is welded at the rear of the electrical receptacle connector. If not covered by the baffle, the rear side of the chip-card signal reading element is easy to be invaded, and the welded pins of the terminals are easy to be connected, resulting in information stealing.

In addition, by using the first soft circuit board and the second soft circuit board that are disposed on two opposite surfaces of the circuit substrate and that have a protection function, the first soft circuit board is covered by the first outer cover, and the second soft circuit board is covered by the second outer cover, to achieve a coating function of a stereoscopic box shape. That is, two sides of the circuit substrate are covered for protection, and the magnetic-card signal reading element and the chip-card signal reading element on the two sides of the circuit substrate are covered and protected. When the first soft circuit board or the second soft circuit board is invaded, a loop protection program is started, so that the card reader having card swiping and card inserting functions is provided with a perfect protection mechanism.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. An electronic protection module, comprising:
a circuit substrate, comprising:
a first surface, comprising a plurality of first connection points, wherein the first surface is electrically connected to a magnetic-card signal reading element;
a second surface, comprising a plurality of second connection points, wherein the second surface is electrically connected to a chip-card signal reading element; and
a groove, passing through from the first surface to the second surface;
a first outer cover, disposed on the first surface, wherein the first outer cover comprises a first through hole, and the magnetic-card signal reading element is located in the first through hole;
a second outer cover, disposed on the second surface, wherein the chip-card signal reading element is disposed in the second outer cover, the second outer cover comprises a second through hole and a plurality of columns, and the second through hole corresponds to a slot of the chip-card signal reading element;
a plurality of first communicated pieces, wherein each of the first communicated pieces is in contact with the first connection point;
a plurality of second communicated pieces, wherein one end of each of the second communicated pieces is positioned on one of the columns, and the other end of the second communicated piece is in contact with one of the second connection points;
a first soft circuit board, adhered to an inner surface of the first outer cover, wherein the first soft circuit board comprises:
a first opening, corresponding to the first through hole of the first outer cover;
a plurality of first holes, disposed corresponding to locations of the first communicated pieces; and
a first terminal, electrically connected to the circuit substrate;
a second soft circuit board, adhered to an inner surface of the second outer cover, wherein the second soft circuit board comprises:
a second opening, corresponding to the second through hole of the second outer cover;
a plurality of second holes, disposed corresponding to locations of the second communicated pieces, wherein the columns respectively pass through the second holes;
a second terminal, wherein the second terminal is electrically connected to the first surface of the circuit substrate through the groove from the second surface to the first surface; and
a plurality of welded pads, located on two sides of the second terminal; and
a baffle, fixed in the groove, wherein one end of the baffle extends to a rear side of the chip-card signal reading element, and the welded pads cover an outer side of the other end of the baffle and are electrically connected to an inner side of the baffle.
2. The electronic protection module according to claim 1, wherein two ends of the baffle comprise a narrow board and a wide board, the narrow board passes through the groove to the rear side of the chip-card signal reading element, and the width of the wide board is greater than the width of the groove, so that the wide board is welded on the first surface.
3. The electronic protection module according to claim 2, wherein the second terminal and the welded pads extend from an outer side surface of the wide board to an inner side surface of the wide board, and the welded pads are welded on the inner side surface of the wide board.

4. The electronic protection module according to claim 3, wherein the baffle comprises a plurality of pins extending outwards from two side ends of the wide board, and the circuit substrate comprises a plurality of buckle holes inserted by the pins.

5. The electronic protection module according to claim 1, further comprising a lock column disposed on the circuit substrate, wherein the lock column passes through a limiting hole of the second terminal to fasten the second terminal.

6. The electronic protection module according to claim 1, further comprising a conversion board, wherein one end of the conversion board is electrically connected to the first surface of the circuit substrate, the other end of the conversion board is connected to the magnetic-card signal reading element, and the first terminal is connected to a connection port of the conversion board.

7. The electronic protection module according to claim 1, wherein the first soft circuit board comprises a plurality of first overlapped areas, the first soft circuit board is bent to a box shape, and the first overlapped areas are respectively located at four corners of the first soft circuit board; and the second soft circuit board comprises a plurality of second overlapped areas, the second soft circuit board is bent to a box shape, and the second overlapped areas are respectively located at four corners of the second soft circuit board.

8. A card reader, comprising:
the electronic protection module according to claim 1; and
a housing, comprising: an accommodation area in which the electronic protection module is disposed, a card swiping slot corresponding to the magnetic-card signal reading element, and a card inserting slot corresponding to the chip-card signal reading element, wherein the housing further comprises a plurality of fixed columns located inside the accommodation area, the fixed columns respectively pass through the first holes, and one end of each of the first communicated pieces is positioned on one of the fixed columns.

9. The card reader according to claim 8, wherein the first communicated pieces and the second communicated pieces each comprise a body and a conductive end, each of the fixed columns of the housing abuts against an inner side surface of a groove of the body of the first communicated piece, and each of the columns of the second outer cover abuts against an inner side surface of a groove of the body of the second communicated piece.

* * * * *